Figure 2:
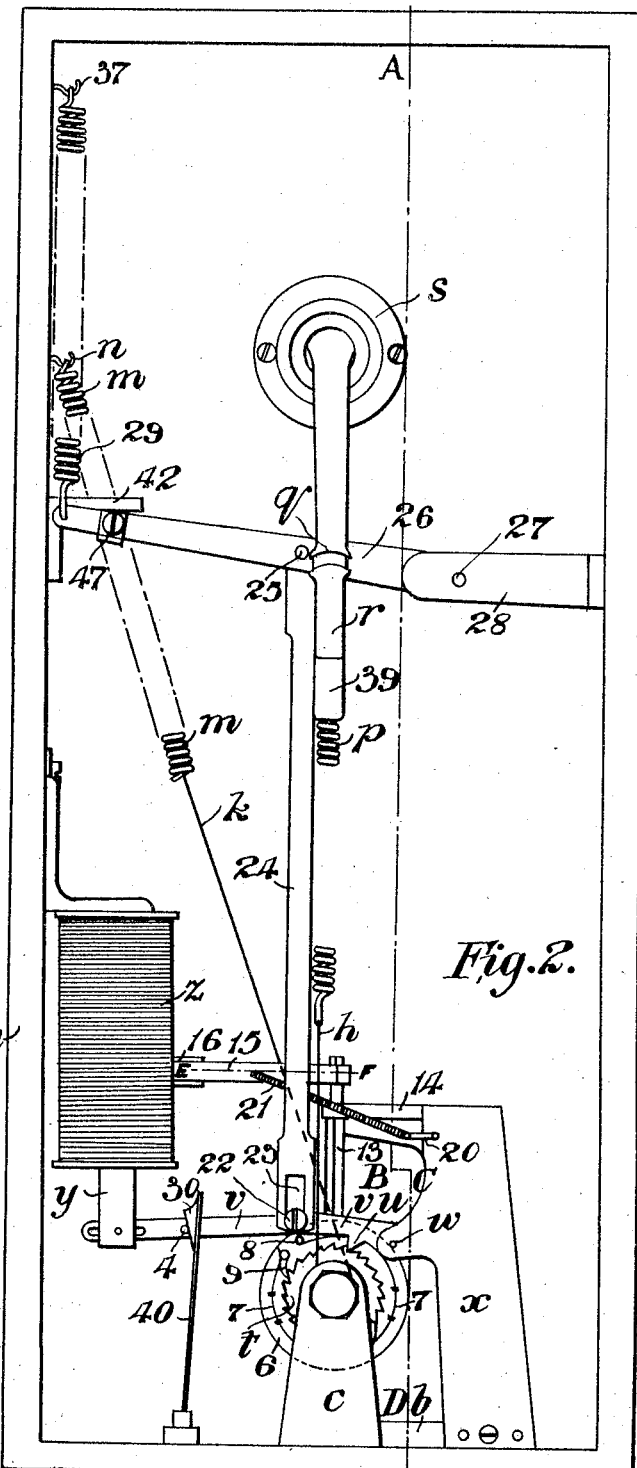

No. 769,279. PATENTED SEPT. 6, 1904.
J. SEEL.
APPARATUS FOR SIGNALING TO TRAINS.
APPLICATION FILED MAR. 19, 1904.
NO MODEL. 7 SHEETS—SHEET 1.
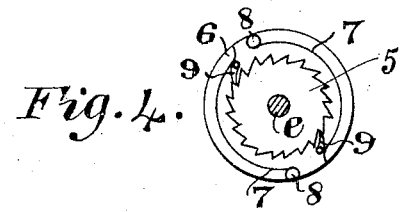
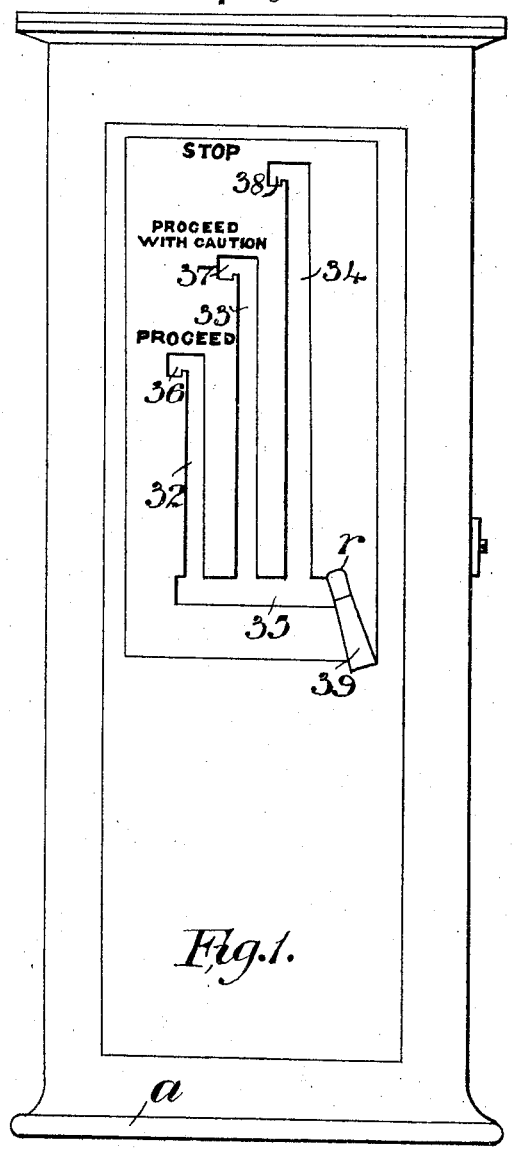
ATTEST:
C. S. Marleton
Edward Sarton
INVENTOR.
JOSEPH SEEL.
by Ellis Spear Company
Attys No. 769,279. PATENTED SEPT. 6, 1904.
J. SEEL.
APPARATUS FOR SIGNALING TO TRAINS.
APPLICATION FILED MAR. 19, 1904.
NO MODEL. 7 SHEETS—SHEET 3.

ATTEST:
C. Marleton
Edward Sarton

INVENTOR.
JOSEPH SEEL
by Ervin Spear Company
ATT'Y,S

No. 769,279. PATENTED SEPT. 6, 1904.
J. SEEL.
APPARATUS FOR SIGNALING TO TRAINS.
APPLICATION FILED MAR. 19, 1904.
NO MODEL. 7 SHEETS—SHEET 4.
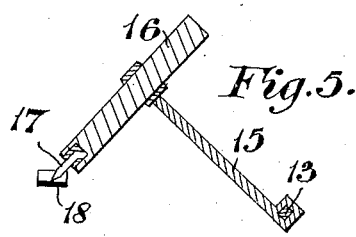
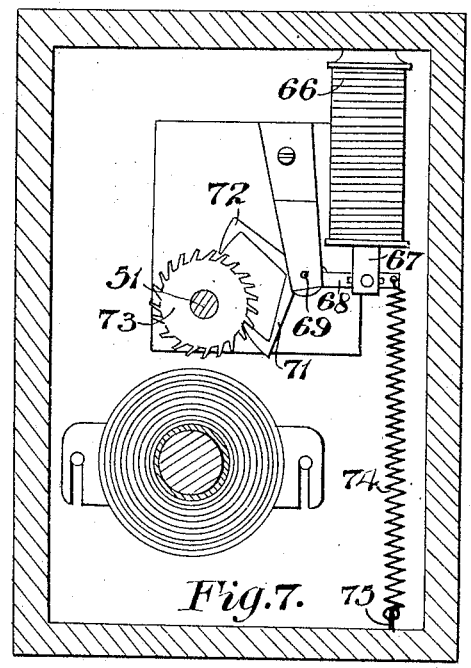
INVENTOR
JOSEPH SEEL.

No. 769,279. PATENTED SEPT. 6, 1904.
J. SEEL.
APPARATUS FOR SIGNALING TO TRAINS.
APPLICATION FILED MAR. 19, 1904.
NO MODEL. 7 SHEETS—SHEET 5.
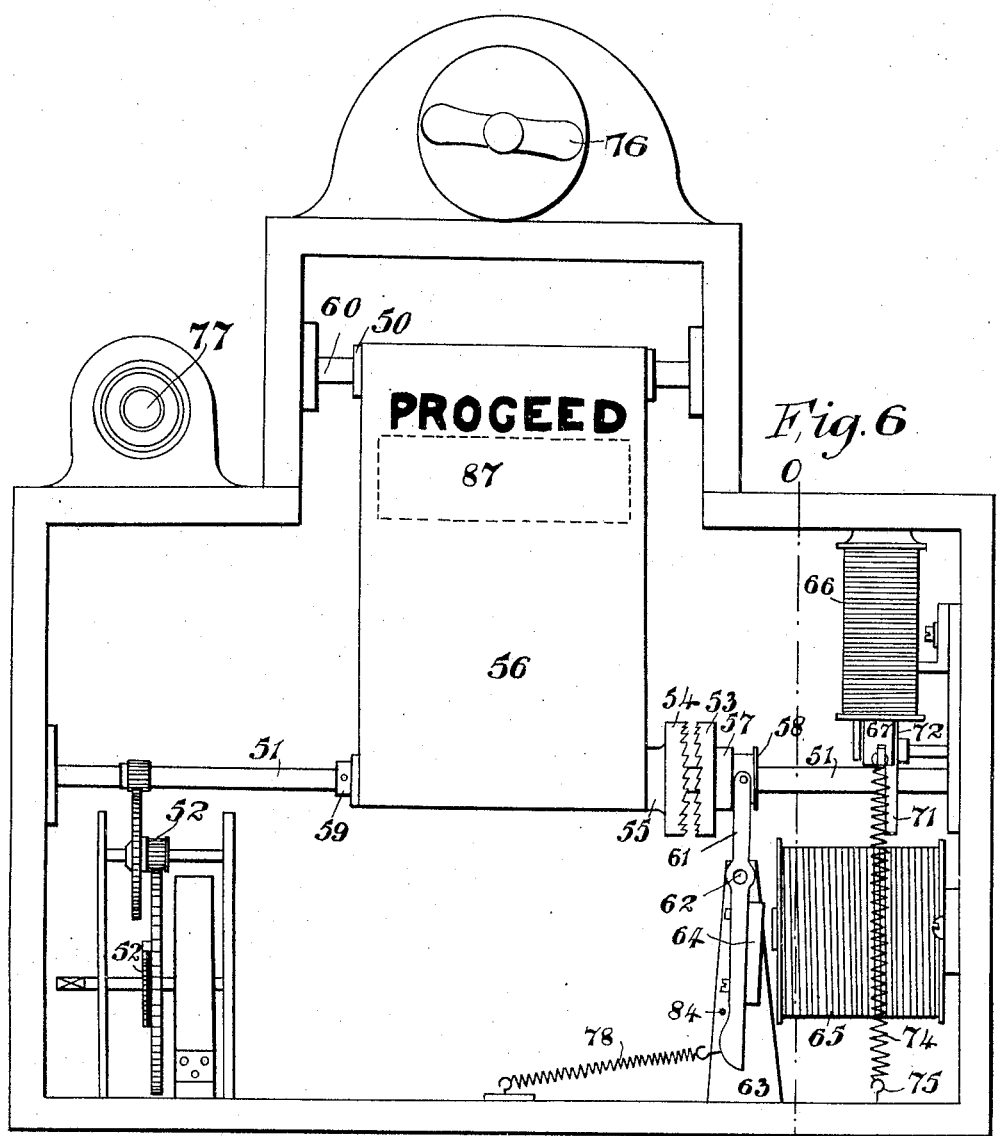
INVENTOR
JOSEPH SEEL.
ATTEST No. 769,279. PATENTED SEPT. 6, 1904.
J. SEEL.
APPARATUS FOR SIGNALING TO TRAINS.
APPLICATION FILED MAR. 19, 1904.
NO MODEL. 7 SHEETS—SHEET 6.

ATTEST
S. Middleton
Edward Sarton

INVENTOR
JOSEPH SEEL
By Ellis Spear Company
Attys

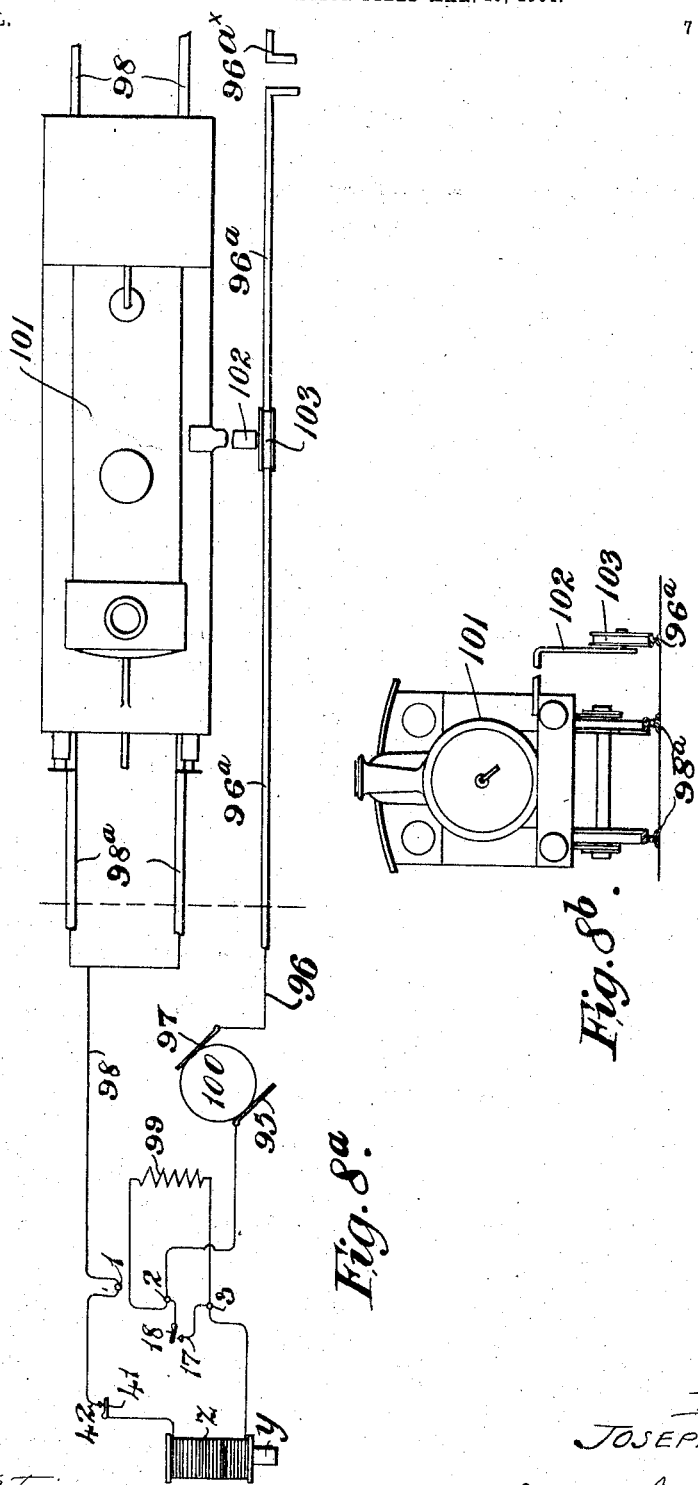

No. 769,279. Patented September 6, 1904.

UNITED STATES PATENT OFFICE.

JOSEPH SEEL, OF MANCHESTER, ENGLAND.

APPARATUS FOR SIGNALING TO TRAINS.

SPECIFICATION forming part of Letters Patent No. 769,279, dated September 6, 1904.

Application filed March 19, 1904. Serial No. 199,023. (No model.)

*To all whom it may concern:*

Be it known that I, JOSEPH SEEL, engineer, a subject of the King of Great Britain and Ireland, and a resident of 12 Nelson street, Lower Broughton, Manchester, in the county of Lancaster, England, have invented certain new and useful Improvements in Apparatus for Signaling to Trains, (for which I have made application for Letters Patent in Great Britain, No. 6,793, dated March 24, 1903,) of which the following is a specification.

My invention relates to apparatus for signaling to trains.

My object is to provide means for signaling which will act equally well in clear and in foggy weather and equally well during the day and at night.

According to my invention, the signals are indicated on the train, and not on the track.

My invention consists in an apparatus which will be described in the following specification and its novel features pointed out in the appended claims.

I provide an electric circuit to convey electric current from a signal-box along the track and through a suitable instrument on the train. I provide current from any convenient source. I may have primary batteries or accumulators in the signal-box, or the current may be fed to the signal-box or to any suitable place on the circuit by feeders taking current from any central station. I may have either a single conductor (which I shall refer to generally as the "line-wire," but which may be a rail or an iron or steel rolled bar) extending along the track and allow the current to return by the ordinary rails, or earth, or I may provide two conductors or line-wires along the track—that is, a positive one and a negative one—or I may dispense entirely with a special conductor and use one of the ordinary track-rails as the positive conductor and the other as the negative conductor. I provide a suitable plow or plows or brush or brushes or trolley or trolleys on the train and cause these to make contact with the line wire of wires or rail or rails, so that current can pass through the instrument on the train. I may place a shield over the line wire or wires, so as to prevent their insulation being spoiled by rain or snow, or I may arrange the insulators to effect this purpose. If desired, I may hang the line wire or wires from and below insulated supports and make the brushes or trolleys carried by the train press upward against them. I prefer to have at least two brushes on the train to make contact with the line-wire or rail or with each line-wire or rail.

The transmitting instrument which I place in the signal-box is arranged to break the circuit before sending a message and then to make and break it a certain number of times, according to the signal or message desired to be sent to the train. This first-mentioned break is in every case absolute and prevents any current passing along the line. The make and break mentioned hereinafter may, however, be arranged with a shunt past it of relatively high resistance, so that when the current is broken by this make and break on the circuit which contains it there is still a relatively feeble current passing along the shunt and the line.

The receiving instrument on the train is provided with an index which moves over a scale or with a movable cloth or sheet on which signals are printed which can be viewed through a window or hole in the box or case containing the instruments, the movement being caused by clockwork or other suitable means controlled by the impulses or beats of the current when the circuit is closed and broken at the signal-box and the movement being proportional to the number of said impulses or beats. When the current stops for more than an instant, the index or sheet goes back to its zero position. The index or sheet will thereafter always be at zero when a new message is sent and will always return to zero when the train passes off the section of line controlled by one signal-box and onto a section controlled by another signal-box. A bell may be arranged to ring when the index or sheet returns to zero, and, if desired, the bell may be arranged to keep on ringing as long as the index or sheet remains at zero—that is, as long as the circuit remains broken. I may, if desired, place an electric motor driving a vane in the circuit, so that the rotation of this will indicate that current is passing, or I may employ an electric lamp for this purpose. A receiving instrument is preferably placed in the signal-box, so that the signalman can check his messages or signals.

If the index or sheet on the receiving instrument goes to zero and remains there, this will indicate that the circuit has been broken through some accident, and this fact will therefore be indicated on the train, (and also at the signal-box, if a receiving instrument is placed there.) If the bell is arranged to ring as long as the circuit remains broken, it will obviously prevent this fact being overlooked.

Figure 3:
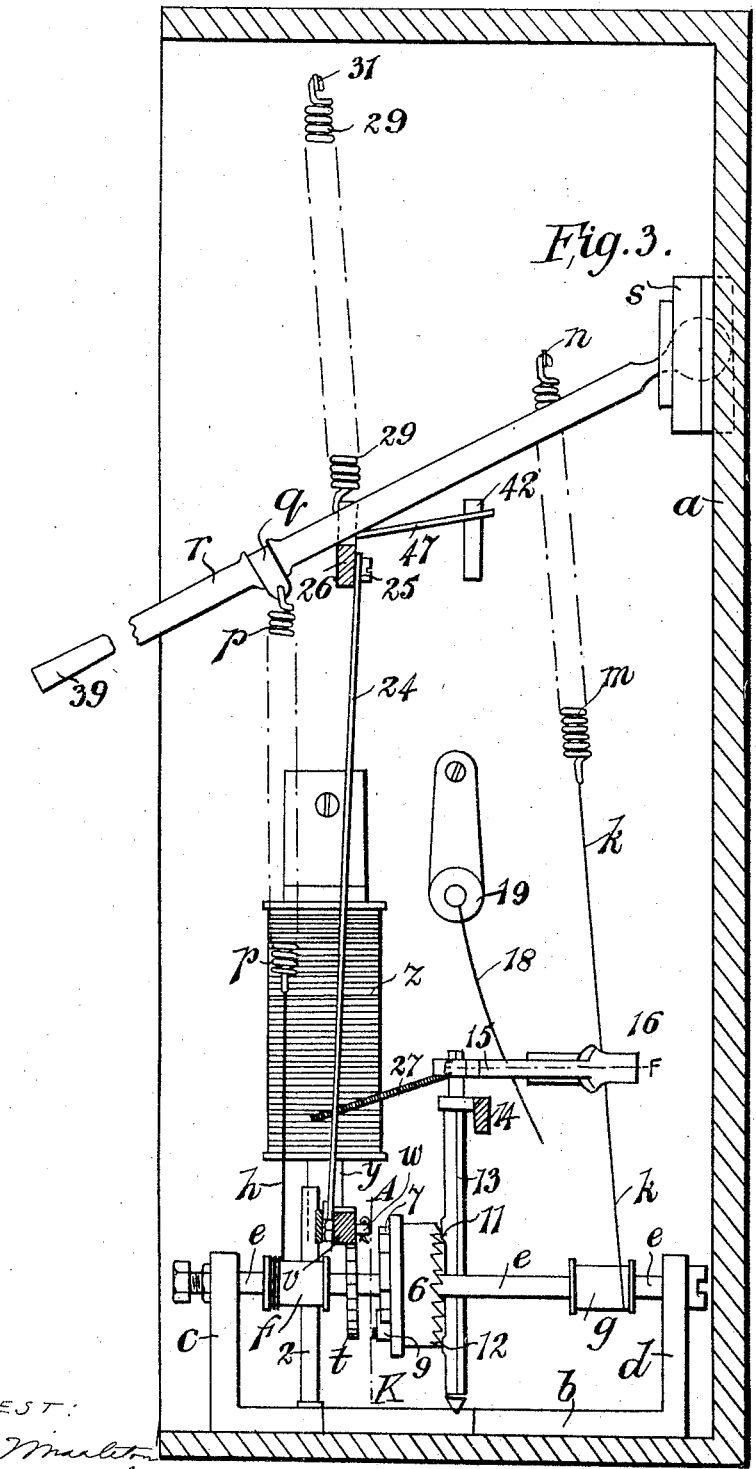
Figure 8:
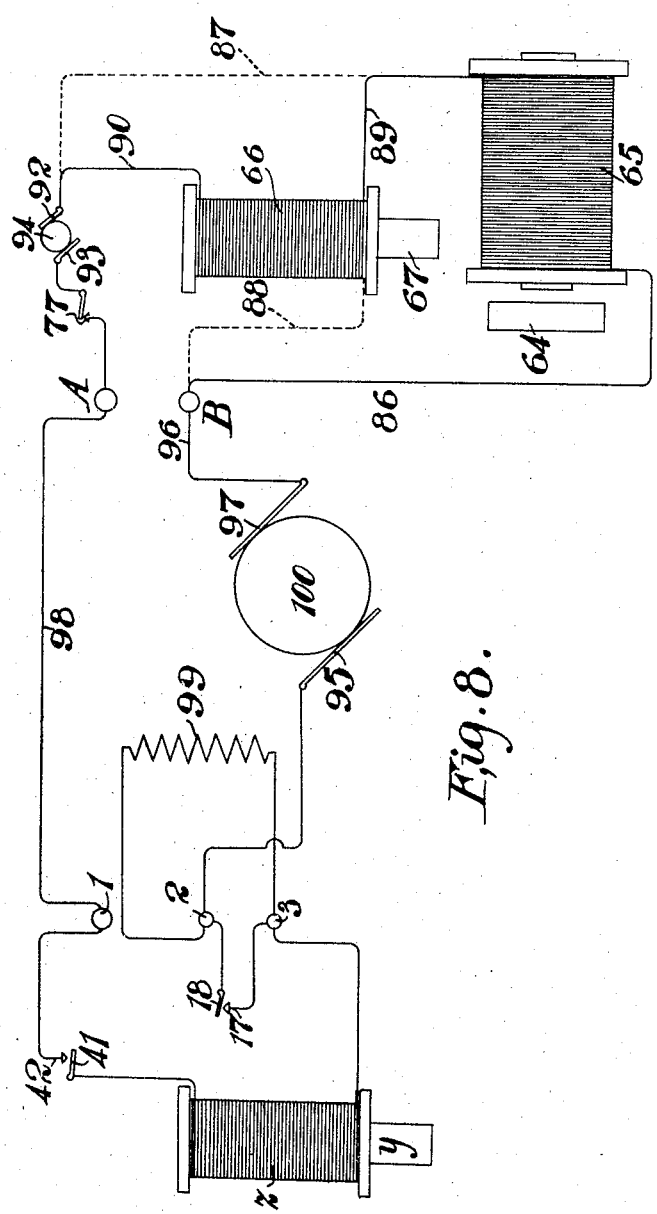

Referring now to the accompanying drawings, which illustrate one convenient form of transmitting and receiving instruments with connections, Figure 1 is a front view of the transmitting instrument. Fig. 2 is a front elevation, drawn to an enlarged scale, of the same, the door or front side of the box being removed. Fig. 3 is a section on the line A B C D of Fig. 2. Fig. 4 is a section on the line A K of Fig. 3 looking from left to right, only certain parts being shown in this section. Fig. 5 is a longitudinal section on the line E F of Figs. 2 and 3, only certain parts being shown. Fig. 6 is a front elevation of the receiving instrument with the front side of the case removed. Fig. 7 is a section on the line O P of Fig. 6. Fig. 8 is a diagrammatic view showing the electrical arrangement and connections. Fig. 8$^a$ is a diagrammatic view showing some of the electrical arrangement and connections and showing a locomotive on a track fitted up according to my invention. Fig. 8$^b$ is an end elevation of certain parts shown in Fig. 8$^a$.

Referring, in the first place, to Figs. 1, 2, 3, 4, and 5, $a$ is the case containing the instrument for transmitting the messages, which case may be of wood, metal, or other convenient substance. $b$ is a metal base-plate having uprights $c$ $d$ at front and back, which uprights form bearings for the shaft $e$. On this shaft are keyed or otherwise rigidly attached two drums $f$ $g$. Cords or chains $h$ $k$ are wound round these drums in opposite directions. The top end of the cord $k$ is attached to the bottom end of the tension-spring $m$, the top end of which is anchored to the frame at $n$. The cord $h$ is attached in a similar manner to the tension-spring $p$, the top end of which is attached to the ring or hoop $q$, carried in a groove on the lever $r$. This lever has a spherical end mounted in a socket $s$, attached to the frame of the machine, so that a universal joint is produced. A ratchet-wheel $t$ is fixed on the shaft $e$, and its teeth are engaged by the pawl $u$, formed integral with the lever $v$, pivoted at $w$ to the support $x$. The lever $v$ is connected by a pivot or by a pin and slot to the core $y$ of the solenoid $z$, which is carried by the frame of the instrument. 40 is a piece of spring-steel attached at its lower end to the frame of the instrument and carrying at its upper end a catch-piece 30, adapted to engage with a pin 4, carried by the lever $v$, for a purpose which will be explained hereinafter. Alongside the ratchet-wheel $t$ and also fixed on the shaft $e$ is another exactly-similar ratchet-wheel 5. (See Fig. 4.) Alongside of this ratchet-wheel 5 is a crown-wheel 6, Figs. 2, 3, and 4, which carries on its face, adjacent to the ratchet-wheel 5, two springs 7 7, each of which is fastened at one end 8 to the crown-wheel, while the other end presses against a pawl 9, so that the springs tend to force these pawls into engagement with the teeth of the ratchet-wheel 5. The pawls are carried by the crown-wheel, which is loose on the shaft and is prevented from moving endwise on the shaft by suitable collars or washers. As far as the working of the apparatus is concerned, it would answer equally well if one ratchet-wheel was employed instead of the two ratchet-wheels $t$ and 5. The teeth on the crown-wheel face engage with pallets 11 12, carried by a rod 13. This rod is supported at its lower end by a footstep-bearing in the base-plate $b$ and at its upper end is supported by the bracket 14. Fixed on the end of the rod 13 is a lever 15, carrying at its end a weight or hammer-head 16. (See Figs. 2, 3, and 5.) This hammer-head carries an insulated pin 17, adapted to make and break contact with a spring 18, carried by a support 19, borne by the frame of the machine. The light tension-spring 21, anchored to a hook 20, carried by the upright $x$, acts so as to tend to keep the pin 17 in contact with the spring 18. The lever $v$ carries a pin 22, which works in a slot 23 in one end of a rod 24, the other end of which is pivoted at 25 to the lever 26. This lever 26 is fulcrumed at one end 27 to a bracket 28, carried by the frame of the machine, while its other end is supported by a spring 29, which is itself hung from a hook 31, carried by the frame of the machine. The lever 26 carries fixed to it a spring-finger 41, adapted to make contact when the lever is in its upper position with an arm 42, which is suitably supported from the frame of the machine.

The front of the instrument, as shown in Fig. 1, is provided with three vertical slots 32, 33, and 34. There may be any convenient number of these slots, according to the number of signals to be given. Three are sufficient to illustrate the working of the instrument. The three vertical slots are united at their lower ends by the horizontal slot 35. Pockets 36, 37, and 38 are formed at the tops of the vertical slots. The lever $r$ is adapted to pass through one or other of these slots, and the lever will normally be situated either in one of the pockets or at the end of the horizontal slot 35, as shown in Fig. 1. The end of the lever is formed as a handle 39, which can be gripped by the hand, so as to place the lever in the desired position.

The working of the instrument is as follows: When the lever $r$ is raised from the slot 35 up one of the vertical slots and placed in one of the pockets, tension is put on the spring $p$. This therefore tends to rotate the drum $f$ in a clockwise direction looking at the drum from the front. If the circuit is broken when this action takes place, the lever $v$ will be in the position indicated, and the pawl $u$ will prevent the rotation of the ratchet-wheel $t$, thus preventing the cord $h$ from rotating the drum $f$. When, however, the circuit is completed—say by a train coming onto the section controlled by this instrument—the solenoid $z$ is energized, the core $y$ is lifted and pulls up with it the lever $v$, thus removing the pawl $u$ from the teeth of the ratchet-wheel $t$. The tension of the spring $p$ then rotates the drum $f$. The shaft $e$ rotates until the tension of the spring $p$ balances that of the spring $m$, and when equilibrium is established the shaft comes to rest. During the movement of the shaft the teeth of the crown-wheel have acted alternately on the pallet 11 and the pallet 12, so as to oscillate the rod 13, and thus give a to-and-fro motion to the hammer-head 16. The pin 17 has therefore been alternately brought into contact with and removed from the spring 18. The main circuit is completed only when the pin 17 makes contact with the spring 18, and therefore this circuit will have been made and broken a number of times corresponding to the number of teeth on the crown-wheel 6 and the number of turns or fraction of a turn given to this wheel. Had the circuit been completed before the lever $r$ was lifted, then the pawl $u$ would have been free from the teeth of the ratchet-wheel $t$, and the shaft $e$ would have commenced to rotate immediately the lever $r$ was raised. In any case the number of makes and breaks at 17 18 would have been the same. When the lever is lowered to the horizontal slot 35, the crown wheel 6 is prevented from rotating backward by the pallets 11 12, which are shaped accordingly; but the teeth of the ratchet-wheel 5 slip past the pawls 9 and allow the shaft $e$ to rotate back under the action of the spring $m$ to its initial position, in which the springs are balanced. When the lever $r$ is lowered and just before it enters the slot 35, the contact is broken between the finger 41 and the arm 42. As the main circuit is by way of these parts, this circuit is broken when the lever is brought into the horizontal slot 35. As the lever cannot be moved from the one slot to the other without being forced into the horizontal slot 35, it follows that the circuit must be broken in passing the lever from the one vertical slot to the other. The three pockets represent three signals. Any desired number of signals may be given by providing a corresponding number of slots and pockets.

Referring now to Figs. 6 and 7, which illustrate the receiving instrument as built in one convenient form, I provide a shaft 51, which is adapted to be actuated by the clockwork 52. On this shaft is mounted one part, 53, of a clutch, the other part, 54, of which is loose on the shaft and made integral with or rigid with a drum or roller 55, on which can be wound up a sheet of cloth 56, on which the signals are printed. This cloth passes at its upper end over another drum or roller, 50, which is mounted on the spindle 60 and is actuated by a light spring, (not shown,) so as to wind up the cloth to the full extent allowed when not prevented by the bottom drum. The part 53 of the clutch is formed rigid with or integral with the collars 57 58, and these three parts are capable of a longitudinal movement along the shaft, although they are compelled to rotate with the shaft owing to a key or feather. The roller 55, although mounted loosely on the shaft, is prevented from having endwise motion by means of collars 59, of which the left-hand one is seen; but the right-hand one is sunk in the part 54 of the clutch. The two parts of the clutch are put in and out of gear by means of a lever 61, pivoted at 62 to a support 63, carried by the frame of the machine. This lever carries an armature 64, which is adapted to be attracted by the electromagnet 65 when this is energized by the current passing through its coils. This magnet is rigidly attached to the frame of the instrument. The solenoid 66 is also rigidly attached to the frame of the instrument. The core 67 of this solenoid is attached by a pivot or pin and slot to the lever 68, which is pivoted at 69 and carries the pallets 71 and 72. These pallets engage with the teeth of the escapement-wheel 73. The tail end of the lever 68 is attached to the top end of the spring 74, the lower end of which is anchored to a hook 75, attached to the frame of the instrument. A vane 76 is preferably arranged in any convenient part of the instrument—say in the position shown at the top of the instrument. This vane is driven by a self-starting electromotor placed in the circuit or in a shunt to the circuit. Instead of the electromotor and vane or in addition thereto I may provide an electric glow-lamp. I may provide a switch 77, which is arranged to break the circuit when required. This switch may be conveniently arranged as a spring-push. It is, however, so arranged that when the button is pushed in it breaks the electric circuit instead of closing it, the spring serving to return the button and close the circuit when the pressure on the button is removed.

The action of the instrument is as follows: The electromagnet 65 and the solenoid are arranged either in parallel or in series and are supplied with current from the line. The electromagnet 65 is wound with a very great number of turns of wire, so that it will hold the armature 64 in its near position against the action of the spring 78, which tends to pull the armature into the off position. (Shown in Fig. 6.) Therefore when once the armature has been attracted toward the magnet the makes and breaks produced in the transmitting instrument will not affect the position of this armature, as the current which passes through the shunt at the transmitting instrument (which shunt will be referred to more particularly hereinafter) will be sufficient to hold the armature in its near position. The solenoid 66, however, is wound so as to be affected by the makes and breaks at the transmitting instrument. It is arranged with much fewer coils. The makes and breaks at the transmitting instrument therefore cause the core 67 to rise and fall in the solenoid, the magnetic attraction acting to draw up the core and the spring acting to draw down the core. The magnetic attraction therefore causes the lever 68 to vibrate, and the pallets 71 and 72 therefore alternately release the teeth of the escapement-wheel 73 and allow this to rotate under the action of the clockwork, but controlled by the pallets. When the armature 64 is in its near position to the magnet 65, the clutch 53 54 will be in gear, and therefore as the shaft 51 rotates, as allowed by the pallets 71 72, the cloth 56 will be wound up on the drum 55 and the amount of winding will be proportional to the number of makes and breaks or beats or waves in the electric circuit. When the making and breaking action ceases and a continuous current passes along the circuit, then the cloth 56 will remain stationary in the position to which it has been wound. Whenever the main circuit is completely broken, the armature 64 will cease to be attracted by the magnet 65 and the spring 78 will pull it into its off position, thus disengaging the clutch and allowing the spring-actuated roller 50 to wind up the cloth to its initial or zero position.

The action of the apparatus will be more fully understood by reference to the diagrams Figs. 8 and 8ª. In these figures the different parts shown, which have been already mentioned, are lettered as in the preceding figures. The source of power, of whatever nature this may be, is indicated by 100. One terminal, 95, of this source of power is connected to the terminal 2 of the transmitting instrument. This is connected by way of the make and break 17 18 to the terminal 3 of the transmitting instrument. The terminals 2 3 are also united to each other by a shunt-circuit containing the resistance-coils 99. The terminal 3 is connected to the electromagnet $z$, and this in turn is connected to the finger 41, which can make contact with the arm 42. This arm 42 is connected to the terminal 1 of the transmitting instrument, which is placed in communication with one of the line-wires 98, leading to the receiving instrument on the locomotive. The other terminal, 97, of the source of power is connected to the other line-wire, 96, leading to the receiving instrument on the locomotive. The parts of the receiving instrument are shown diagrammatically in Fig. 8, but are not shown in Fig. 8ª, which, however, shows the locomotive 101, which carries the receiving instrument. In Fig. 8ª the line-wire 98 is shown connected to the ordinary rails 98ª, and the line-wire 96 is shown connected to a third rail 96ª, from which the locomotive picks up the current by means of a trolley-wheel 103, carried by an arm 102, projecting from the locomotive 101. The locomotive, trolley, and rails are shown in end elevation in Fig. 8ᵇ. Referring to Fig. 8, the terminal A of the receiving instrument is connected to the line-wire 98 and the terminal B of the receiving instrument is connected to the line-wire 96. The terminal A is connected by way of the switch 77 with one terminal, 93, of the motor 94, which works the vane 76, Fig. 6. The other terminal, 92, of the same motor is connected by the wire 90 to the solenoid 66, which in turn is put in communication with the electromagnet 65 by the wire 89. This electromagnet is in turn connected to the teriminal B of the receiving instrument by the wire 86. As before mentioned, the solenoid 66 and the electromagnet 65 may be put in parallel instead of in series. The wire connection 89 will in this case be replaced by the wire connections 88 and 87, (shown in dotted lines.)

It will be seen that when the circuit is broken at 17 18 there may still be a current passing through the line-wires, owing to the shunt-circuit between the terminals 2 and 3 through the resistance-coils 99. This will allow a relatively feeble current to pass through the line-wires, which current is powerful enough to keep the armature 64 in the near position with regard to the electromagnet 65, but is not sufficient to hold up the core 67 within the solenoid 66. I may, however, if desired, dispense with the shunt-circuit between the terminals 2 and 3 and may so construct the electromagnet 65 that it will not let go the armature 66 at the breaks of the circuit caused at 17 18, which breaks may be arranged to be of very short duration.

It will be obvious that if the circuit is broken at the line-wires 96 98—that is, if a locomotive is not on the section of line controlled by the transmitting instrument—there will be no current passing through the solenoid $z$, and therefore the core $y$ will not be raised. This core $y$ is always pushed down to its lowest position from off the support 30 (see Fig. 2) by the lever 26, rod 24, and lever $v$ whenever the lever $r$ is brought down to the horizontal slot 35 in order to give a new signal. It therefore follows that if a train is not in a section controlled by the transmitting instrument when the lever $r$ of that instrument is raised and placed in one of the pockets no rotation will be given to the shaft $e$ of the transmitting instrument. As soon, however, as the circuit is completed by a train coming onto a section of line controlled by the transmitting instrument the core $y$ will be drawn up into the solenoid $z$, the pawl $u$ lifted from the teeth of the ratchet-wheel $t$, the shaft $e$ allowed to rotate, and the circuit alternately made and broken at 17 18. One end of the rail 96$^A$ is shown in Fig. 8$^a$, and close to this is shown the commencement of the corresponding rail 8$^{ax}$ of the next section.

It has already been explained that the motion given to the cloth 56 is proportional to the number of makes and breaks or beats or waves in the electric current passing by way of the line-wires between the transmitting and receiving instruments. It has also been explained that the number of makes and breaks or beats or waves given to the electric current depends on the number of turns or fraction of a turn given to the crown-wheel 6— that is, depends upon the distance the lever is raised. The pockets 36, 37, and 38 in the transmitting instrument are arranged at different heights, so that the raising of the lever $r$ into any one pocket produces a definite and distinctive amount of movement in the cloth 56 in the receiving instrument. Printed signals are provided on the cloth 56 and are so arranged that each aforesaid distinctive movement given to the cloth brings one of said signals into a position to be seen. Therefore the position of the lever $r$ in any one of the pockets in the transmitting instrument corresponds to a particular printed signal on the cloth 56 at the receiving instrument. Only one signal can be read on the receiving instrument at a time, because the front of the receiving instrument is non-transparent, except for a small window, the position of which is indicated by the dotted lines 87 in Fig. 6.

The cloth 56 may be illuminated either from the front or from the back in order that the signals may be easily read.

The push or switch 77 can be employed to enable the driver to query any message which has been sent. By pressing the push or otherwise breaking the circuit he can cause the sheet of his receiving instrument to go to the zero position. The instrument at the signal-box will be acted on similarly, and the signalman will therefore have to repeat the message—that is, he will have to lower the lever $r$ to the horizontal slot 35 and then replace it in the pocket.

I may arrange a bell actuated by a local battery situated on the locomotive to be actuated so as to ring whenever the armature 64 goes into its off position. This can be arranged by the lever 61 striking the pin 84, and thus completing the bell-circuit. The current in this circuit has no connection whatever with the current actuating the receiving instrument, but is an ordinary bell-circuit, and as the bell may be of any convenient type it does not require further description. Moreover, this bell is not an essential part of my invention. The bell may be either a single-stroke bell or may be a bell of the usual kind, so that it will ring as long as the armature 64 is in its off position.

Although electromagnets provided with armatures have been described in some cases and solenoids provided with cores in other cases, it will be understood that these devices may be substituted the one for the other, as may be considered desirable, and that other electrical and mechanical devices may be replaced by equivalent devices. For example, weights and springs may be substituted one for the other to a certain extent. It will, however, be desirable to avoid weights in the receiving instrument on account of the jolting and vibration of the train. For the same reason it will be advisable to balance the moving parts as far as possible.

As the transmitting and receiving instruments necessarily return to their zero positions before a new signal is given, it will be obvious that one signal is quite unaffected by the signal previously given. There is therefore no chance of an error being gradually accumulated.

Having now described my invention, what I claim as new, and desire to secure by Letters Patent, is—

1. In electric signaling apparatus, the combination of a transmitting instrument with a receiving instrument, with means for generating electrical energy and with electrical conductors connecting these; the transmitting instrument comprising a spring adapted to be positively tensioned to a greater or less extent according to the signal desired to be sent, a shaft adapted when free to be forwardly rotated by this spring, an electromagnet, an armature adapted to be attracted by said electromagnet and in this action to free the said shaft, an escapement-wheel, an escapement adapted to be actuated by said escapement-wheel and to make and break an electric circuit at every double vibration and a second spring adapted to rotate back the shaft to its initial position when allowed by the first-mentioned spring; and the receiving instrument comprising an electromagnet adapted to be energized by electric current controlled by the transmitting instrument, a spring-actuated armature adapted to be attracted by the said electromagnet and to reciprocate with the makes and breaks in the circuit produced at the transmitting instrument, a second armature, an electromagnet adapted to attract this second armature and hold it against the action of a spring during the said makes and breaks, but to drop this armature when the current passing through the instrument completely stops for more than an instant, a clutch controlled by said (last-mentioned) armature and clockwork adapted to act through said clutch to produce the motion required to exhibit signals, an escapement-wheel on said clockwork and an escapement adapted to control this escapement-wheel and to be actuated by the first-mentioned armature on the receiving instrument, substantially as and for the purpose described.

2. In apparatus for electrically signaling to trains, a transmitting instrument comprising a spring adapted to be positively tensioned to a greater or less extent according to the signal desired to be sent, a shaft adapted when free to be forwardly rotated by this spring, an electromagnet, an armature adapted to be attracted by said electromagnet and in this action to free the said shaft, an escapement-wheel, an escapement adapted to be actuated by said escapement-wheel and to make and break an electric circuit at every double vibration and a second spring adapted to rotate back the shaft to its initial position when allowed by the first-mentioned spring, substantially as and for the purpose described.

3. In apparatus for electrically signaling to trains, a receiving instrument, comprising an electromagnet adapted to be energized by electric current, a spring-actuated armature for the said electromagnet adapted to reciprocate with an intermittent current or with waves or beats of current passing through the electromagnet-coils, a second armature, an electromagnet adapted to attract this second armature and hold it against the action of a spring during the continuance of the said intermittent current or the said waves or beats of current and adapted to drop the armature when the current passing through the instrument completely stops for more than an instant, a clutch controlled by said (last-mentioned) armature, clockwork adapted to act through said clutch to produce the motion required to exhibit signals, an escapement-wheel on said clockwork, and an escapement adapted to control this escapement-wheel and to be actuated by the first-mentioned armature, substantially as and for the purpose described.

4. In apparatus for electrically signaling to trains, a receiving instrument, comprising an electromagnet adapted to be energized by electric current, a spring-actuated armature for the said electromagnet adapted to reciprocate with an intermittent current or with waves or beats of current passing through the electromagnet-coils, a second armature, an electromagnet adapted to attract this second armature and hold it against the action of a spring during the continuance of the said intermittent current or the said waves or beats of current and adapted to drop the armature when the current passing through the instrument completely stops for more than an instant, a clutch controlled by said last-mentioned armature, clockwork adapted to act through said clutch to produce the motion required to exhibit signals, an escapement-wheel on said clockwork, an escapement adapted to control this escapement-wheel and to be actuated by the first-mentioned armature, and an electric lamp adapted to glow except when the current is completely stopped for more than an instant, substantially as and for the purpose described.

5. In apparatus for electrically signaling to trains, a receiving instrument, comprising an electromagnet adapted to be energized by electric current, a spring-actuated armature for the said electromagnet adapted to reciprocate with an intermittent current or with waves or beats of current passing through the electromagnet-coils, a second armature, an electromagnet adapted to attract this second armature and hold it against the action of a spring during the continuance of said intermittent current or the said waves or beats of current and adapted to drop the armature when the current passing through the instrument completely stops for more than an instant, a clutch controlled by said last-mentioned armature, clockwork adapted to act through said clutch to produce the motion required to exhibit signals, an escapement-wheel on said clockwork, an escapement adapted to control this escapement-wheel and to be actuated by the first-mentioned armature and a spring-push switch adapted to break the circuit and keep it broken only when the button is pressed, substantially as and for the purpose described.

In witness whereof I have hereunto set my hand in presence of two witnesses.

JOSEPH SEEL.

Witnesses:
 ROBERT MORRISON NEILSON,
 VIVIAN ARTHUR HUGHES.